(12) United States Patent
Zhu et al.

(10) Patent No.: US 10,597,527 B2
(45) Date of Patent: Mar. 24, 2020

(54) HEAVY OIL DEMULSIFIER

(71) Applicant: Hongbin Zhu, Beijing (CN)

(72) Inventors: Hongbin Zhu, Beijing (CN); Hope Lewis, Foster City, CA (US); Bozhao Shao, Beijing (CN)

(73) Assignee: ZHU, HONGBIN, Beijing (CN)

(*) Notice: Subject to any disclaimer, the term of this patent is extended or adjusted under 35 U.S.C. 154(b) by 259 days.

(21) Appl. No.: 15/851,615

(22) Filed: Dec. 21, 2017

(65) Prior Publication Data
US 2019/0194449 A1 Jun. 27, 2019

(51) Int. Cl.
| | |
|---|---|
| *B01D 17/04* | (2006.01) |
| *C08G 83/00* | (2006.01) |
| *C08G 63/668* | (2006.01) |
| *C08G 73/02* | (2006.01) |
| *C08L 79/02* | (2006.01) |
| *C08L 67/00* | (2006.01) |
| *C08L 71/00* | (2006.01) |
| *C10G 33/04* | (2006.01) |
| *C08G 65/26* | (2006.01) |

(52) U.S. Cl.
CPC ............ *C08L 67/00* (2013.01); *B01D 17/047* (2013.01); *C08G 63/668* (2013.01); *C08G 65/2624* (2013.01); *C08G 73/028* (2013.01); *C08G 83/003* (2013.01); *C08L 71/00* (2013.01); *C10G 33/04* (2013.01); *C08G 2650/24* (2013.01); *C08G 2650/58* (2013.01); *C10G 2300/44* (2013.01)

(58) Field of Classification Search
CPC ........ C08G 83/002–004; C08G 73/028; C08G 63/12; B01D 17/04–048
See application file for complete search history.

(56) References Cited

U.S. PATENT DOCUMENTS

| 4,507,466 A * | 3/1985 | Tomalia | B01D 17/047 528/332 |
| 2006/0289359 A1* | 12/2006 | Manek | B01D 17/047 210/708 |
| 2007/0100002 A1* | 5/2007 | Leinweber | B01D 17/047 516/179 |
| 2011/0011806 A1* | 1/2011 | Ebert | B01D 17/047 210/708 |
| 2011/0272327 A1* | 11/2011 | Bruchmann | B01D 17/047 208/188 |

FOREIGN PATENT DOCUMENTS

CN 101418230 B * 10/2012
WO WO-2007039083 A1 * 4/2007

OTHER PUBLICATIONS

Machine Translation of CN101418230B dated Oct. 10, 2012. (Year: 2012).*

* cited by examiner

*Primary Examiner* — Stephen E Rieth
(74) *Attorney, Agent, or Firm* — Yue (Robert) Xu; Apex Attorneys at Law, LLP

(57) ABSTRACT

This invention provides a composite type heavy oil demulsifier and its preparation methods. The demulsifier includes two effective constituents. The constituent I is an amino nonionic dendritic polyether and the constituent II is a dendritic ester acid. The structural formula is presented as Formula I and II, respectively. The demulsifier has good abilities in interfacing between oil and water and reducing viscosity. It has good demulsification performance in breaking crude oil emulsion and is useful in heavy crude oil production and petroleum refining.

5 Claims, 3 Drawing Sheets

HEAVY OIL DEMULSIFIER

FIELD OF THE INVENTION

This invention relates to the preparation of dendritic compounds and their uses as demulsifiers in breaking crude oil emulsion.

BACKGROUND OF THE INVENTION

With the recoverable reserves of light oil decreasing and oil production technology advancing constantly, the percentage of heavy oil in crude oil production will keep increasing in the 21st century. Heavy oil is a complex mixture rich in asphaltene and resin. Its main features include high viscosity, small difference in oil/water density and low mobility. Since asphaltene and resin in the heavy oil are natural surfactants, the heavy oil and formation water would form the emulsion in the process of heavy oil production more or less. Besides, the high viscosity of heavy oil mainly due to the high content of asphaltene and resin. Therefore, demulsification and dehydration of heavy oil are indispensable steps in oilfield production.

With the continuous development of petroleum industry, the demand for demulsifier is increasing and the performance requirement for it will be much higher. Thus, it is necessary to conduct research to develop new improved demulsifiers. Petroleum demulsifier has over 90 years of history, and the first patent that mentioned it was published by W. S. Barnickel in 1949. The inventor suggested to demulsify the water oil emulsion at 35~60° C. by using a 0.1% $FeSO_4$ solution. From the 1920s, surfactants started to be used as demulsifiers, and the main types included fatty acid salt, arenyl or alkyl hydrocarbon sulfonate, castor oil, sulfonate, naphthenate and so on. In 1940s to 1970s, nonionic surfactant has been used as demulsifier gradually, and alkylphenols including nonyl phenol, isooctyl phenol, octyl phenol, and isobutyl phenol were used. Though these nonionic surfactants have good abilities in resistance to salinity, the demulsification effects are not so good. Then in the late 80s, an ever increasing amount of efforts were put into the research and development of new types of demulsifiers. As a result, a third generation of demulsifiers based on high molecular weight polyether was developed, with much improved performance.

Currently, heavy oil demulsification still face many difficulties. Much of time, the demulsifier could be effective only when heated over 90° C. This invention aims to solve the problems of high temperature and high cost of energy in heavy oil demulsification. Highly efficient, low temperature heavy oil demulsifiers have been screened, discovered, and described herein.

DETAILED DESCRIPTION OF THE INVENTION

Figure 1:
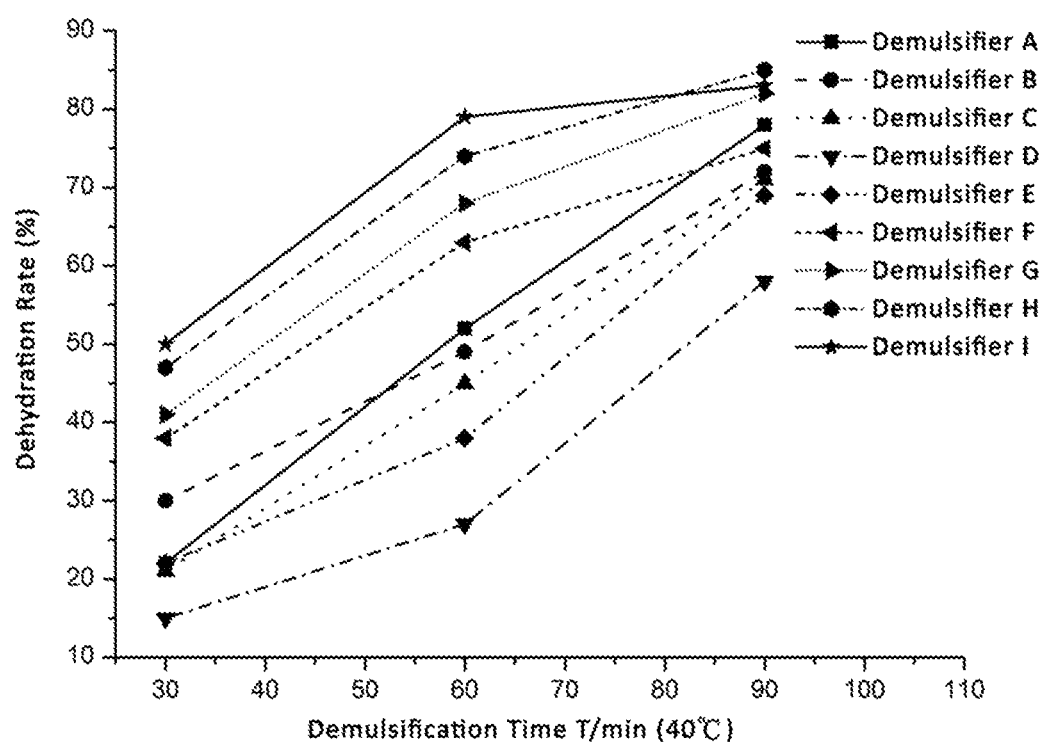
FIG. 1 shows the experimental results of demulsification effects of composite crude oil demulsifiers on heavy oil samples at 40° C.

Persons of ordinary skill in the art will realize that the following description is illustrative only and not in any way limiting. Other modifications and improvements will readily suggest themselves to such skilled persons having the benefit of this disclosure.

One of the goals of this invention is to supply a petroleum demulsifier with good ability to break water-in-oil type emulsion at low temperature.

In a preferred embodiment of this invention, the effective constituents make up 40%~60% mass percent of the demulsifier. The effective constituents include two components. Constituent I is an amino nonionic dendritic polyether represented as Formula I, and Constituent II is a dendritic polyether ester acid represented as Formula II. Constituent I accounts for 50%~80% of mass percent of the effective constituents, and Constituent II accounts for 50%~20% of mass percent. The solvent includes one or more of the solvents selected from water, methanol, ethanol, and xylene.

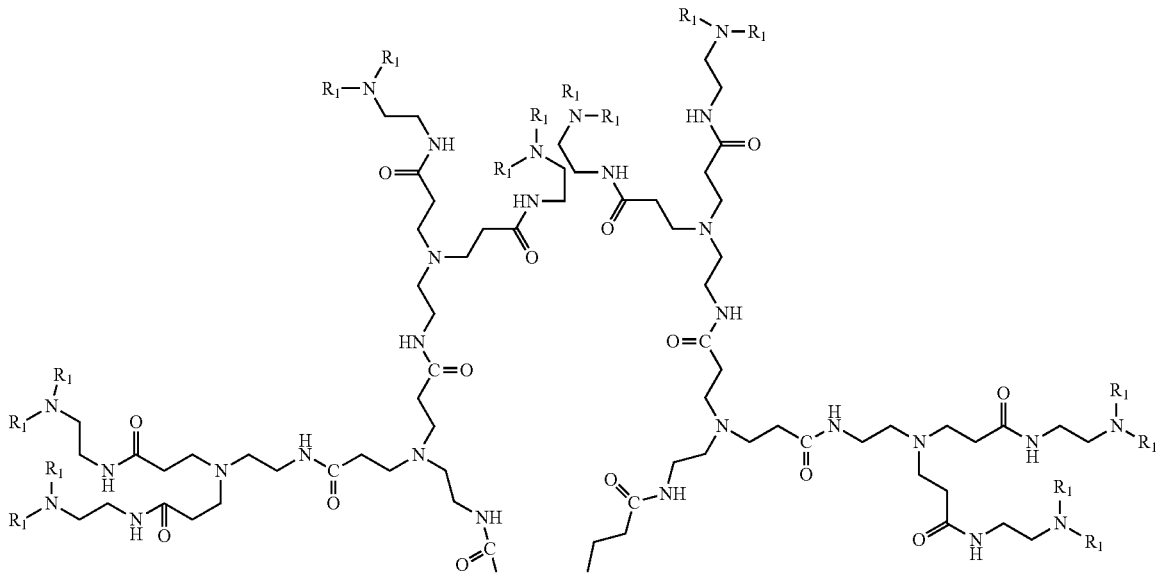

Formula I

-continued

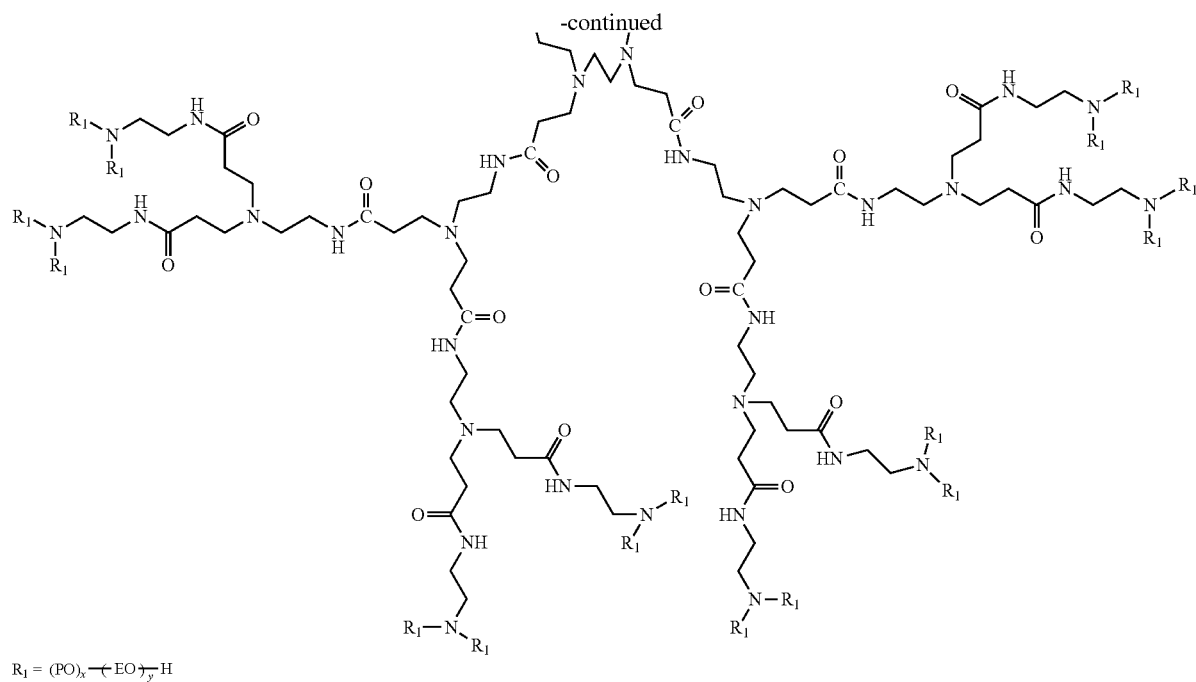

$R_1 = (PO)_x\text{--}(EO)_y\text{--}H$

Formula II

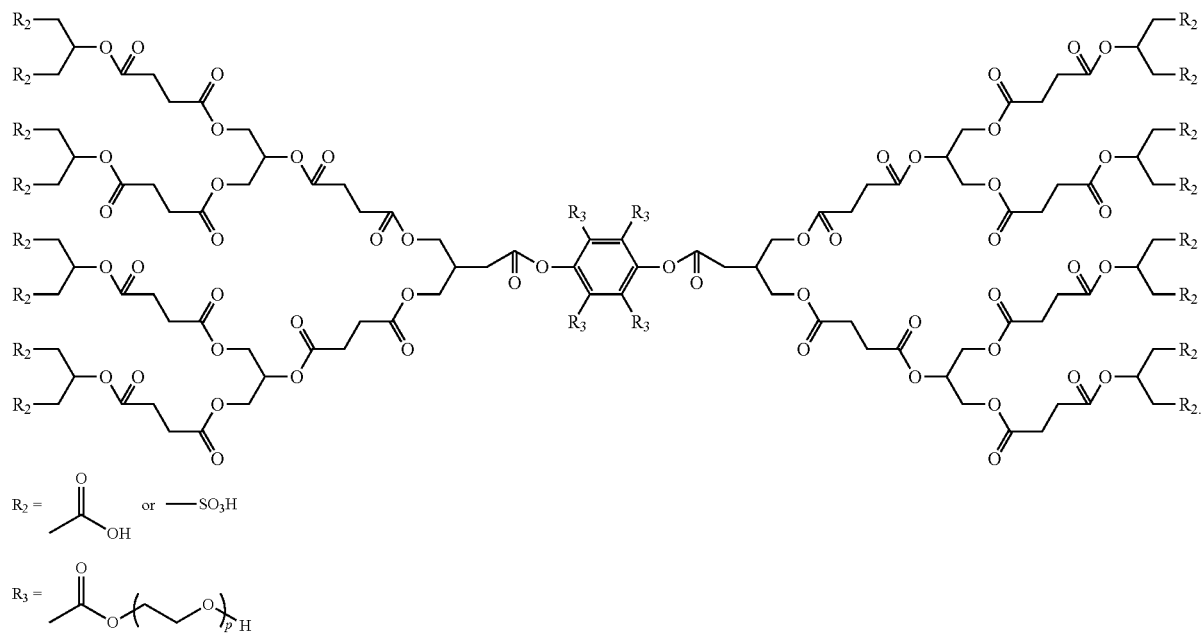

$R_2 = $ ![acetic acid] OH   or   —SO$_3$H $R_3 = $ ![PEG carboxylate structure]

Constituent I is an amino nonionic dendritic polyether. As shown in Formula I, $R_1$ refers to $(PO)_x$-$(EO)_y$—H polyether structure, wherein x represents numbers between 10 and 100, and y represents numbers between 5 and 50. PO represents the oxypropylene unit after propylene epoxide ring opening. EO represents the oxyethylene unit after ethylene oxide ring opening.

Constituent II is a dendritic ester acid. As shown in Formula II, $R_2$ refers to a carboxylic acid group. $R_3$ represents

that is a polyethylene glycol carboxylate. P represents numbers between 0 and 20.

In an aspect of the embodiment, the solvent in the demulsifier includes one or more kinds of solvents including water, methanol, ethanol and xylene. In another aspect of the embodiment, the total mass of solvent is about 50% of the demulsifier.

In another aspect of the embodiment, the mass ratio of Constituent I (Formula I) and Constituent II (Formula II) is 1:1 to 4:1, for example, 1:1, 4:1 or 7:3.

The composite crude oil demulsifier of the present invention can be made by mixing Constituent I, Constituent II, and the solvent.

The composite demulsifiers of this invention have unique structural features and also have good abilities at interfacing between water and oil, and at reducing viscosity. It can quickly reach the interface between water and oil and form a new unstable oil-water interfacial film, replacing the natural surface-active substances. As a result, this demulsifier has good demulsification ability to break crude oil emulsion and can be effectively applied in the area of low temperature dehydration of heavy oil.

EXAMPLES

Experimental methods commonly practiced in the art are employed in the following examples unless otherwise noted. The materials and reagents in the following examples can be obtained commercially if no special illustration is provided.

The dendritic polyether compound of Formula I is produced by alkyloxy reaction between polyamide-amine compound and epoxy compound. The general preparation method is described in Chinese patent 200710176351.8. The specific method is as follows. (1) Obtain carboxylic ester compound (a) from Michael Addition reaction between ethylenediamine and excess methacrylate. This addition reaction proceeds very quickly at room temperature and has high selectivity. (2) Use the carboxylic ester compound (a) obtained from Step 1 to react with excess ethylenediamine to get generation 1.0 polyamidoamine (b). Here the generation number corresponds to the molecular weight of polyamidoamine, and the generation number would increase 1 after every round of Step 1 and Step 2 reactions. Keep repeating Step 1 and Step 2 to get different generations of polyamidoamine with increasing molecular weight. (3) Mix polyamidoamine obtained from Step 2 and a catalyst, which can be potassium hydroxide, sodium hydroxide or sodium ethoxide, in a high pressure reactor, heat up the temperature to 100° C., slowly add propylene epoxide, control the temperature between 120° C. and 140° C., the pressure between 0.2-0.4 Mpa, reaction time 2-5 h, cool to 100° C., then add ethylene oxide into the reactor for another 2-5 h under the same condition as previous step, then neutralize with phosphoric acid to get the dendritic polyether compound of Formula I.

A specific example of the above process is described as follows.

Synthesis of PAMAM G-0.5: Add 9.0 g ethylenediamine and 32 g methanol into a 500 mL three-necked flask. Purge with nitrogen to remove oxygen. Add 103.2 g methacrylate at 35° C., and stir the reaction mixture at 35° C. for 24 h. Remove the solvent by rotary evaporation, and obtain the product as a faint yellow liquid.

Synthesis of PAMAM G-1.0 synthesis: Add 72.0 g ethylenediamine and 36.0 g methanol into a 500 mL three-necked flask, and purge with nitrogen to remove the oxygen. Add 20.2 g PAMAM G-0.5 and 64.0 g methanol mixture at 35° C., and stir the reaction mixture at 35° C. for 24 h. Rotary evaporate the product mixture to remove the solvent and excess ethylenediamine, and obtain the product as a faint yellow sticky liquid. Repeat the steps to get higher generations of PAMAM.

The dendritic polyether compound of Formula I is obtained by reacting Generation 3.0 polyamidoamine sequentially with propylene epoxide and ethylene oxide. In a preferred example, the alkylation reactions with ethylene oxide and propylene oxide are conducted at 120° C., in the presence of potassium oxide as a catalyst. The molar amounts of reactants added to the reaction are according to the molecular structure of the desired product. The addition of ethylene oxide and propylene oxide is sequential and block-type according to the structure of the desired product. As a result, the numbers x and y in Formula I conforms to the molar ratio of the reactants added to the reactions. The theoretical molecular weight of the compound of Formula I closely conforms to the molecular weight determined by instrumental analytic methods. Therefore, the chemical structure of the dendritic polyether compound of Formula I is well-defined. This is also because self-polymerizations of ethylene oxide and propylene oxide are at relatively low levels and do not affect the theoretical product structure.

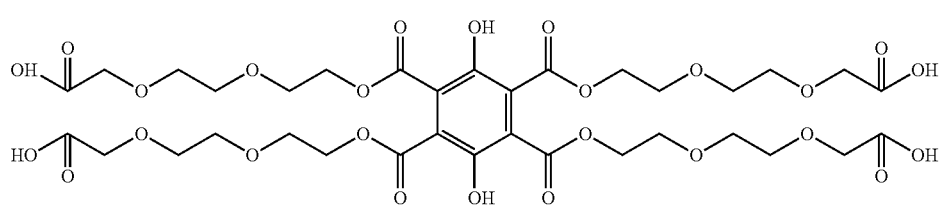

Formula III

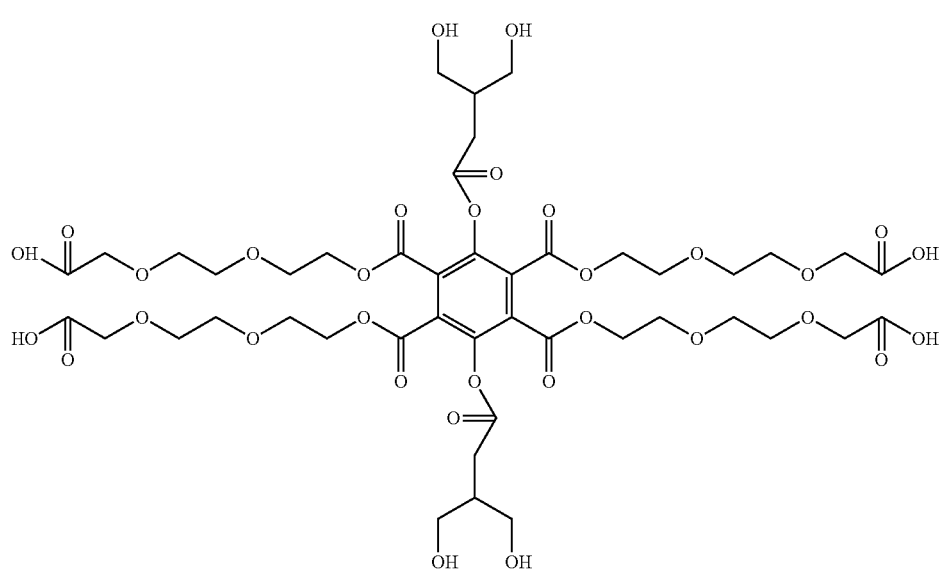

Formula IV

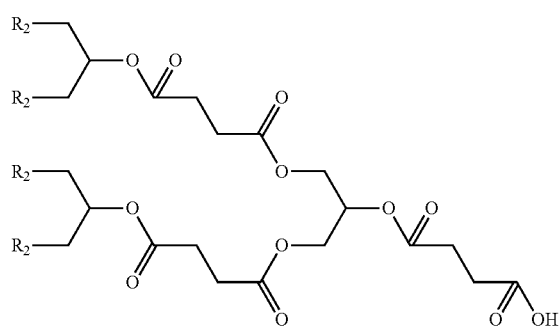

Formula V

The dendritic polyether ester acid compounds shown as Formula II was prepared using the following typical method. (1) Charge 350 g triethylene glycol, 1 ml concentrated sulfuric acid, 2 g DEAD and 0.5 g $PPh_3$ into a Dean-Stark apparatus containing 100 ml toluene. Reflux and remove water by diversion. Slowly add 143 g 3,6-dihydroxy benzene-1,2,4,5-tetracarboxylic acid through a constant pressure dropping funnel. Stir the reaction mixture at 60° C. for 1 h then heat up to 180° C. and stir for additional 3 h. The reaction is then stopped and cooled to room temperature. The reaction product is filtered, rinsed by water, and purified by recrystallization. The terminal hydroxyl is then oxidized by using acidic potassium permanganate, and the compound shown as Formula III is obtained by filtration. (2) The compound of Formula III obtained from Step 1 and 4-hydroxy-3-(hydroxymethyl) butyric acid are used for esterification reaction. Charge 197.5 g compound of Formula III, 2 ml concentrated sulfuric acid, 4 g DEAD and 1 g $PPh_3$ into a Dean-Stark apparatus containing 200 ml toluene. Reflux and remove water by diversion. Slowly add 80 g 3,6-dihydroxy benzene-1,2,4,5-tetracarboxylic acid through a constant pressure dropping funnel. Stir at 60° C. for 1 h and then heat up to 180° C. Let the reaction proceed for 3 h and then stop. Filtration, rinsing by water, separation and recrystallization afforded the compound of Formula IV. (3) Use succinic acid and glycerol to prepare fan-shaped dendritic molecule by loop esterification reaction, the detailed operation procedure is: Add 92 g glycerol, 1 ml concentrated sulfuric acid, 2 g DEAD and 1 g $PPh_3$ into a Dean-Stark apparatus containing 100 ml toluene. Reflux and remove water by diversion. Slowly add 400 g succinic acid through a constant pressure dropping funnel. Stir at 60° C. for 1 h then heat up to 180° C., and react for 3 h then stop. Filtration, rinsing by water, separation and recrystallization afforded an intermediate product. Repeat the steps of Step (3) but using the intermediate product instead of succinic acid to get the compound of Formula V. (4) Use the compounds of Formula IV and V for esterification reaction in 1:5 molar ratio to get dendritic ester acid of Formula II. The operation procedure is parallel to Step (3).

The demulsifier of the current invention is a complex system including the dendritic polyether of Formula I and the dendritic ester acid of Formula II mixed in a solvent. The proportion of composition would affect the demulsification ability. Various compositions of the demulsifier have been tested. Detailed preparation steps of representative examples are described as follows.

Example 1: Preparation of New Type Composite Petroleum Demulsifier A

The composite petroleum demulsifier A was obtained by mixing 50 g Formula I compound (dendritic polyether, x represents 50, y represents 30), 50 g Formula II compound (dendritic polyether ester acid bridged by phenoxy, p represents 5), and 100 g ethanol. The mass ratio of Formula I compound to Formula II compound is 1:1. The mass ratio of the total mass of Formula I & II compounds to ethanol is 1:1.

Example 2: Preparation of New Type Composite Petroleum Demulsifier B

The composite crude oil demulsifier B was obtained by evenly mixing 70 g compound of Formula I (wherein x is 70, y is 30), 30 g compound of Formula II (p-Phenoxy bridged dendritic polyether ester acid, p is 5) and 100 g ethanol. The mass ratio of the compound of Formula I to the compound of Formula II is 7:3. The mass ratio of the total mass of compounds of Formula I and Formula II to ethanol is 1:1.

Example 3: The Preparation of Novel Composite Crude Oil Demulsifier C

The composite crude oil demulsifier C was obtained by mixing 50 g compound of Formula I (wherein x is 100, y is 60), 50 g compound of Formula II (p-Phenoxy bridged dendritic polyether ester acid, p is 10) and 100 g ethanol. The mass ratio of compound of Formula I and compound of Formula II is 1:1. The mass ratio of the total mass of compounds of Formula I and Formula II to the mass of ethanol is 1:1.

Example 4: The Preparation of Novel Composite Crude Oil Demulsifier D

Evenly mix 50 g compound of Formula I (wherein x is 70, y is 30), 50 g compound of Formula II (p-Phenoxy bridged dendritic polyether ester acid, p is 15) and 100 g ethanol, obtain composite crude oil demulsifier, labeled D, wherein the mass ratio of compound of Formula I and compound of Formula II is 1:1, the mass ratio of the total mass of compounds of Formula I and Formula II to ethanol is 1:1.

Example 5: The Preparation of Novel Composite Crude Oil Demulsifier E

The composite crude oil demulsifier E was obtained by mixing 80 g compound of Formula I (wherein x is 40, y is 10), 20 g compound of Formula II (p-Phenoxy bridged dendritic polyether ester acid, p is 10), and 100 g ethanol. The mass ratio of compound of Formula I to compound of Formula II is 8:2, and the mass ratio of compounds of Formula I and II to ethanol is 1:1.

Example 6: The Preparation of Novel Composite Crude Oil Demulsifier F

The composite crude oil demulsifier F was obtained by evenly mixing 80 g compound of Formula I (wherein x is 10, y is 5), 20 g compound of Formula II (p-Phenoxy bridged dendritic polyether ester acid, p is 20), and 100 g ethanol. The mass ratio of compound of Formula I to compound of Formula II is 8:2. The mass ratio of the combined mass of compounds of Formula I and II to the mass of ethanol is 1:1.

Example 7: The Preparation of Novel Composite Crude Oil Demulsifier G

By evenly mixing 80 g compound of Formula I (wherein x is 60, y is 20), 20 g compound of Formula II (p-Phenoxy bridged dendritic polyether ester acid, p is 5), and 100 g ethanol, composite crude oil demulsifier labeled G was obtained. The mass ratio of compound of Formula I and compound of Formula II is 8:2. The mass ratio of the combined mass of compounds of Formula I and II to the mass of ethanol is 1:1.

Example 8: The Preparation of Novel Composite Crude Oil Demulsifier H

By evenly mixing 80 g compound of Formula I (wherein x is 60, y is 40), 20 g compound of Formula II (p-Phenoxy bridged dendritic polyether ester, p is 5), and 100 g ethanol, composite crude oil demulsifier H was obtained. The mass ratio of the compound of Formula I to the compound of Formula II is 8:2. The mass ratio of the total mass of compounds of Formula I and II to the mass of ethanol is 1:1.

Example 9: The Preparation of Novel Composite Crude Oil Demulsifier I

By evenly mixing 80 g compound of Formula I (wherein x is 70, y is 50), 20 g compound of Formula II (p-Phenoxy bridged dendritic polyether ester, p is 20), and 100 g ethanol, composite crude oil demulsifier I was obtained. The mass ratio of compound of Formula I to compound of Formula II is 8:2. The mass ratio of the total mass of compounds of Formula I and II to that of ethanol is 1:1.

Example 10: Comparison of the Demulsification Effect of Composite Crude Oil Demulsifiers A、B 、C、D、E、F、G、H and I.

The bottle-test method was conducted for the demulsification of sample heavy oil. The viscosity of heavy oil used in the tests was 11,000 mpa·s. The results are shown in Table 1 and Table 2.

The bottle-test was performed according to the petroleum and natural gas industrial standards SY/T5281-2000 published in "Bottle test method for the demulsification performance of crude oil demulsifiers." The crude oil was obtained from an oil field and diluted using diesel to desired viscosity of about 11,000 mpa·s. The initial water content in the oil ranged from 30% to 70% but was uniform across test samples. The detailed experimental procedure is as follows.

A sample of crude oil product was introduced into a number of test bottles. The bottles were then heated in a water bath to reach a predetermined constant temperature (40, 60, or 80° C.), and the temperature of the oil was kept constant for at least 15 min. A predetermined amount of composite crude oil demulsifiers (A、B、C、D、E、F、G、H and I) were then injected into the test bottles.

Mechanical shaking method or manual shaking method was used to shake the dehydration bottles. a) Mechanical shaking method: screw the bottle caps tightly and immediately put the bottles on a shaker, shake for 0.5-5 min to mix completely, take test bottles off the shaker and loosen the bottle caps, and put the bottles in a thermostatic water bath again for stock-still settling. b) Manual shaking method: screw the bottle caps tightly and invert the bottles up and down for 2-5 times. Slowly loosen the bottle caps to release gas pressure, replace the caps tightly again, shake the bottles manually or put the bottles in a manual shaking box, horizontally shake for 50-200 times with amplitude more than 20 cm. After the ingredients have been fully mixed, put the bottles in a thermostatic water bath again for stock-still settling.

The amount of water separated at different time points were visually inspected and recorded. The color of separated water and oil-water interface conditions were also recorded at demulsification end point.

Table 1 shows the experimental results of demulsification effect of composite crude oil demulsifiers in Examples 1-9 on heavy oil samples at 40° C.

TABLE 1

| No. | Demulsifier | Temperature (° C.) | Concentration (mg/L) | Dehydration rate (%) at different time points | | | O/W (mg/L) | Water color |
|---|---|---|---|---|---|---|---|---|
| | | | | 30 min | 60 min | 90 min | | |
| 1 | A | 40 | 100 | 22 | 52 | 78 | 200 | clear |
| 2 | B | 40 | 100 | 30 | 49 | 72 | 250 | clear |
| 3 | C | 40 | 100 | 21 | 45 | 71 | 250 | clear |
| 4 | D | 40 | 100 | 15 | 27 | 58 | 150 | clear |
| 5 | E | 40 | 100 | 22 | 38 | 69 | 300 | clear |
| 6 | F | 40 | 100 | 38 | 63 | 75 | 350 | clear |
| 7 | G | 40 | 100 | 41 | 68 | 82 | 300 | clear |
| 8 | H | 40 | 100 | 47 | 74 | 85 | 350 | clear |
| 9 | I | 40 | 100 | 50 | 79 | 83 | 300 | clear |
| 10 | Blank | 40 | 0 | 0 | 0 | 0 | — | |

The experimental results of demulsification effects of composite crude oil demulsifiers on heavy oil samples at 40° C. are shown in FIG. 1.

Figure 2:
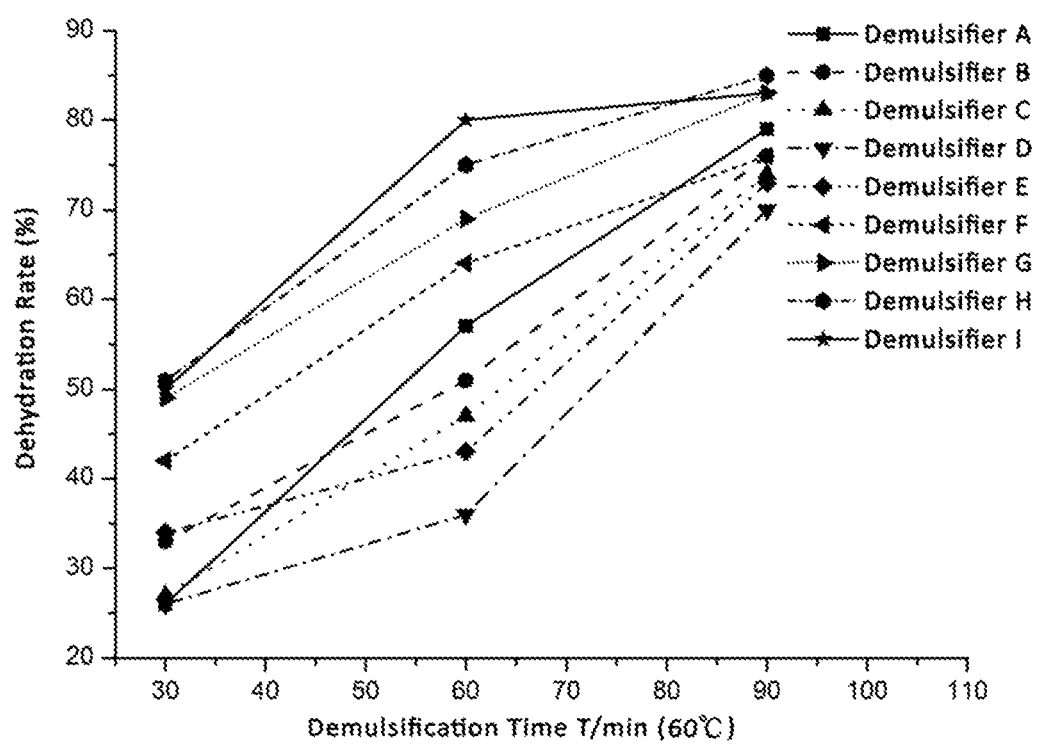
FIG. 2 shows the experiment result of demulsification effects of composite crude oil demulsifiers on heavy oil sample at 60° C.

Table 2 and FIG. 2 show the experimental results of demulsification effects of composite crude oil demulsifiers in Example 1-9 on heavy oil samples at 60° C.

TABLE 2

| No. | Demulsifier | Temperature (° C.) | Concentration (mg/L) | Dehydration rate (%) at different time points | | | O/W (mg/L) | Water color |
|---|---|---|---|---|---|---|---|---|
| | | | | 30 min | 60 min | 90 min | | |
| 1 | A | 60 | 100 | 26 | 57 | 79 | 200 | clear |
| 2 | B | 60 | 100 | 33 | 51 | 76 | 250 | clear |
| 3 | C | 60 | 100 | 27 | 47 | 74 | 250 | clear |
| 4 | D | 60 | 100 | 26 | 36 | 70 | 150 | clear |

TABLE 2-continued

| No. | Demulsifier | Temperature (° C.) | Concentration (mg/L) | Dehydration rate (%) at different time points | | | O/W (mg/L) | Water color |
|---|---|---|---|---|---|---|---|---|
| | | | | 30 min | 60 min | 90 min | | |
| 5 | E | 60 | 100 | 34 | 43 | 73 | 300 | clear |
| 6 | F | 60 | 100 | 42 | 64 | 76 | 350 | clear |
| 7 | G | 60 | 100 | 49 | 69 | 83 | 300 | clear |
| 8 | H | 60 | 100 | 51 | 75 | 85 | 350 | clear |
| 9 | I | 60 | 100 | 50 | 80 | 83 | 300 | clear |
| 10 | Blank | 60 | 0 | 0 | 0 | 0 | — | |

Table 3 shows the experiment result of demulsification effects of composite crude oil demulsifiers in Example 1-9 on heavy oil sample at 80° C.

TABLE 3

| No. | Demulsifier | Temperature (° C.) | Concentration (mg/L) | Dehydration rate (%) at different time points | | | O/W (mg/L) | Water color |
|---|---|---|---|---|---|---|---|---|
| | | | | 30 min | 60 min | 90 min | | |
| 1 | A | 80 | 100 | 38 | 72 | 80 | 200 | clear |
| 2 | B | 80 | 100 | 43 | 69 | 79 | 250 | clear |
| 3 | C | 80 | 100 | 46 | 68 | 76 | 250 | clear |
| 4 | D | 80 | 100 | 42 | 73 | 74 | 150 | clear |
| 5 | E | 80 | 100 | 47 | 63 | 73 | 300 | clear |
| 6 | F | 80 | 100 | 47 | 75 | 76 | 350 | clear |
| 7 | G | 80 | 100 | 50 | 72 | 84 | 300 | clear |
| 8 | H | 80 | 100 | 51 | 77 | 85 | 350 | clear |
| 9 | I | 80 | 100 | 51 | 83 | 83 | 300 | clear |
| 10 | Blank | 80 | 0 | 0 | 0 | 0 | — | |

Figure 3:
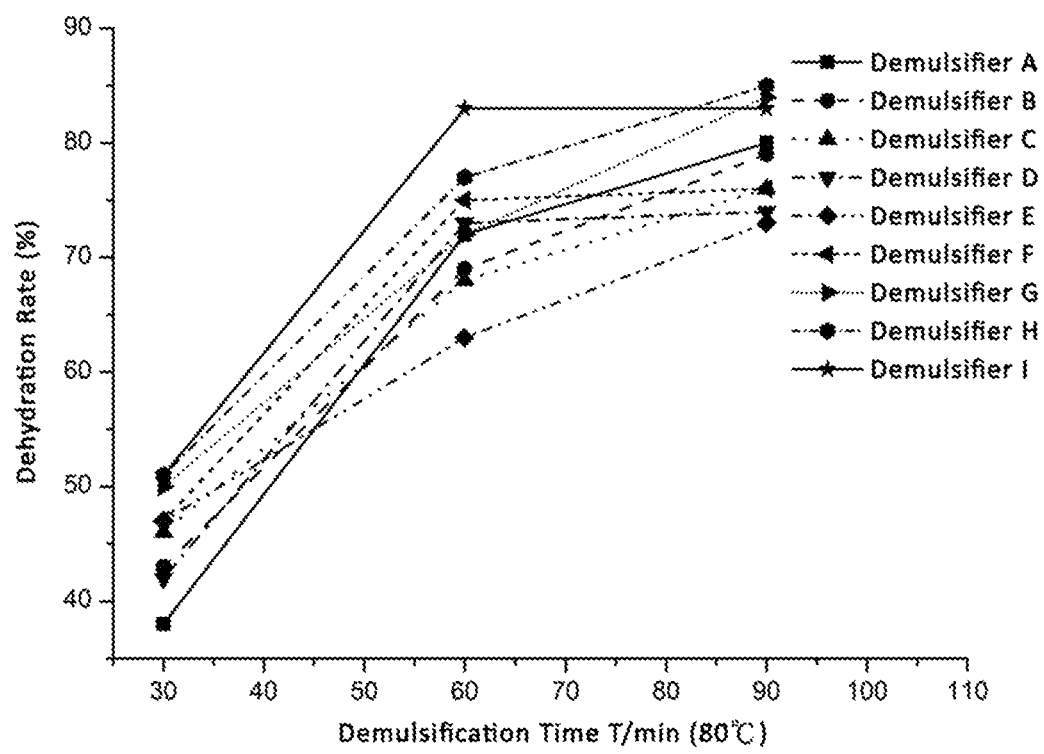
FIG. 3 shows the experimental results of demulsification effects of composite crude oil demulsifiers on heavy oil samples at 80° C.

FIG. 3 shows the experimental results of demulsification effects of composite crude oil demulsifiers on heavy oil samples at 80° C.

The above results indicate that crude oil demulsifiers of this invention have good demulsification performances against water-in-oil emulsion, especially demulsifier H, whose dehydration rate reached above 80% at temperature 10° C. lower than the usual demulsification temperature in commercial operations.

While embodiments and applications of this disclosure have been shown and described, it would be apparent to those skilled in the art that many more modifications and improvements than described above are possible without departing from the inventive concepts herein. The disclosure, therefore, is not to be restricted except in the spirit of the appended claims.

What is claimed is:

1. A heavy oil demulsifier, comprising:
   Constituent I that is a dendritic polyether of Formula I, wherein, PO represents oxypropylene, EO represents oxyethylene, x represents numbers between 10 and 100 inclusive, and y represents numbers between 5 and 60 inclusive;
   Constituent II that is a dendritic ester acid of Formula II, wherein p represents numbers between 5 and 20 inclusive; and
   a solvent including one or more solvents selected from the group consisting of water, methanol, ethanol, and xylene Formula I
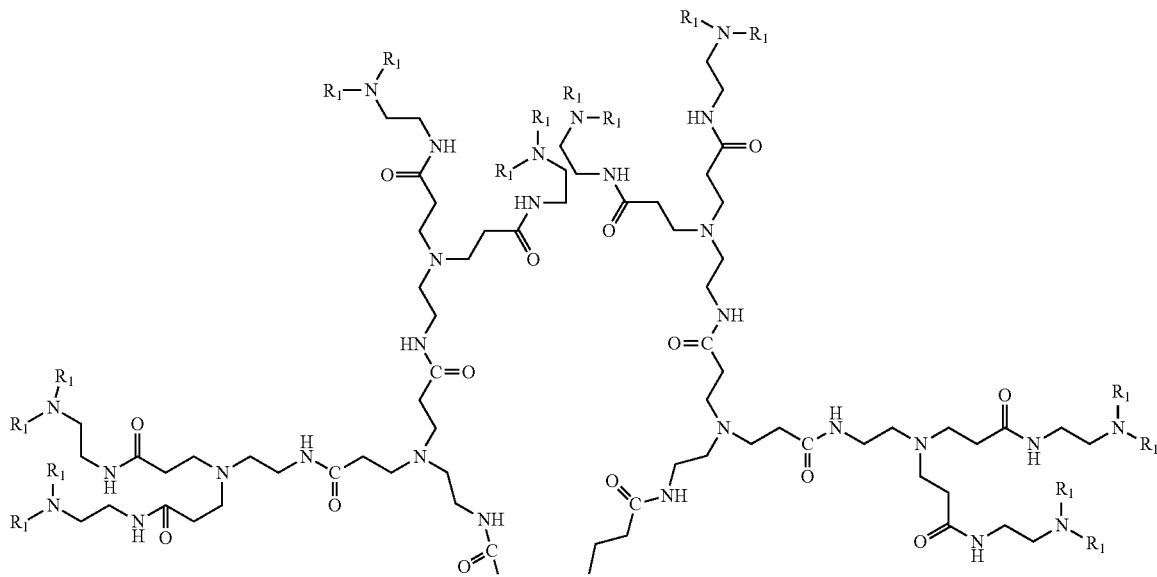
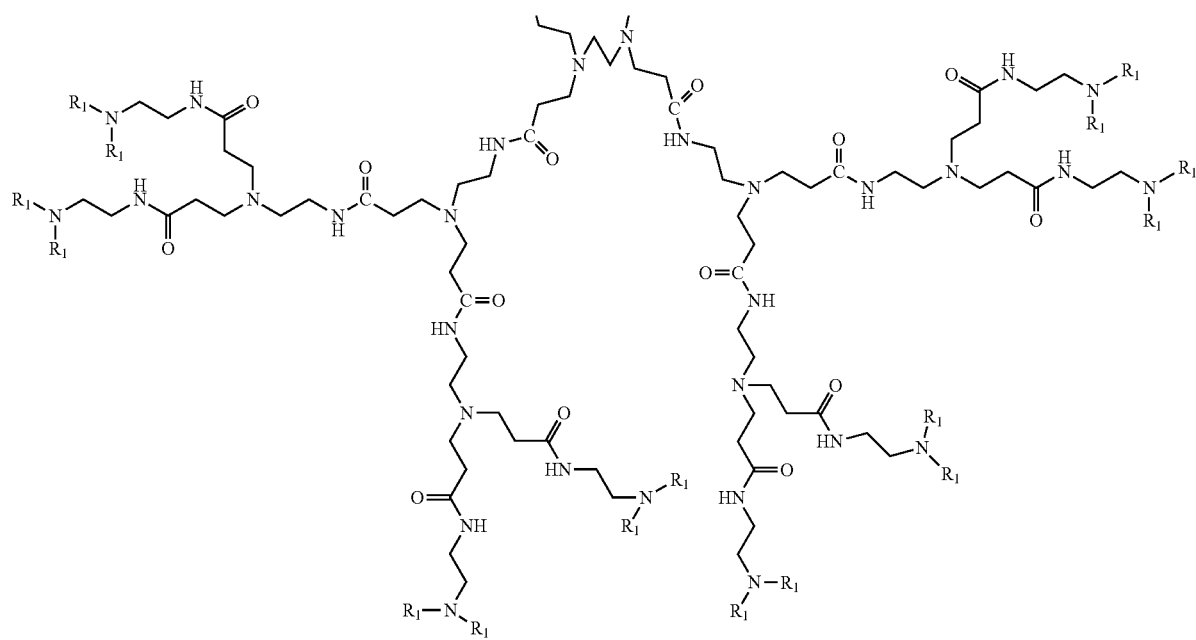
$R_1 = (PO)_x\text{−}(EO)_y\text{−}H$ Formula II

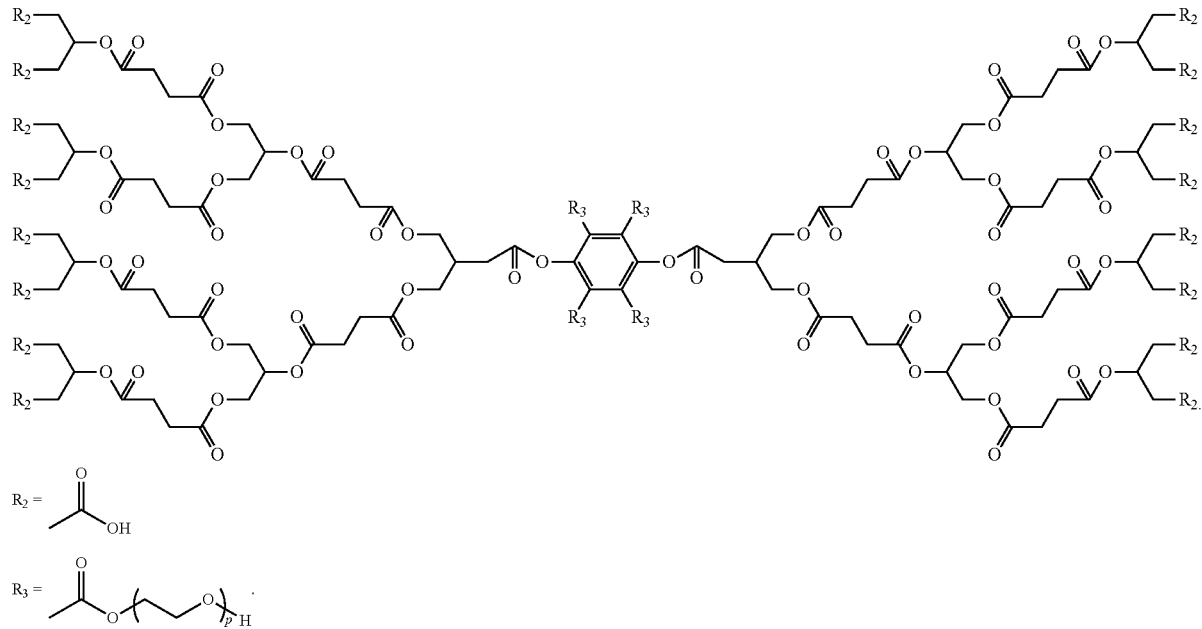

2. The heavy oil demulsifier of claim 1, wherein the mass ratio between Constituent I and Constituent II is 1:1 to 4:1.

3. The heavy oil demulsifier of claim 2, wherein x is 50 to 100, and y is 30 to 60, and the mass ratio of Constituent I to Constituent II is 7:3 to 4:1.

4. The heavy oil demulsifier of claim 3, wherein x is 60 to 70, and y is 40 to 50, and the mass ratio of Constituent I to Constituent II is about 4:1.

5. The heavy oil demulsifier of claim 2, wherein the total mass of Constituent I and Constituent II is 40% to 60% of the heavy oil demulsifier.

* * * * *